United States Patent [19]

Arlt et al.

[11] Patent Number: 5,306,805
[45] Date of Patent: Apr. 26, 1994

[54] PROCESS FOR THE PREPARATION OF POLYARYLENE SULPHIDES

[75] Inventors: Wolfgang Arlt; Wolfgang Alewelt; Karl-Heinrich Meyer; Manfred Schmidt; Erhard Tresper, all of Krefeld; Wolfgang Eisermann, Duesseldorf, all of Fed. Rep. of Germany

[73] Assignee: Bayer AG, Leverkusen, Fed. Rep. of Germany

[21] Appl. No.: 832,886

[22] Filed: Feb. 10, 1992

[30] Foreign Application Priority Data

Feb. 23, 1991 [DE] Fed. Rep. of Germany ....... 4105748

[51] Int. Cl.$^5$ ............................................. C08G 75/14
[52] U.S. Cl. ................................... 528/387; 528/388; 528/381
[58] Field of Search ................. 528/387, 381, 388

[56] References Cited

U.S. PATENT DOCUMENTS

| | | | |
|---|---|---|---|
| 3,919,177 | 11/1975 | Campbell | 528/373 |
| 4,060,520 | 11/1977 | Irvin | 528/387 |
| 4,324,886 | 4/1982 | Edmonds, Jr. et al. | 528/387 |
| 4,373,090 | 2/1983 | Edmonds, Jr. | 528/387 |
| 4,451,643 | 5/1984 | Edmonds, Jr. et al. | 528/387 |
| 5,066,776 | 11/1991 | Russeler et al. | 528/388 |

FOREIGN PATENT DOCUMENTS 0086487  8/1983  European Pat. Off. .
0414079  2/1991  European Pat. Off. .

*Primary Examiner*—John C. Bleutge
*Assistant Examiner*—Helen F. Lee
*Attorney, Agent, or Firm*—Connolly & Hutz

[57] ABSTRACT

This invention relates to a simplified process for the preparation of polyarylene sulphides with improved product quality from alkali metal sulphides and dihalogenated aromatic compounds, in which the alkali metal sulphides are prepared and reacted in situ.

12 Claims, No Drawings

PROCESS FOR THE PREPARATION OF POLYARYLENE SULPHIDES

This invention relates to a simplified process for the preparation of polyarylene sulphides with improved product quality from alkali metal sulphides of dihalogenated aromatic compounds, in which the alkali metal sulphides are prepared and reacted in situ.

Polyarylene sulphides and processes for their production are known, e.g. from U.S. Pat. No. 33 54 129 and EP-A 171 021. Some of these processes consist of reactions under high pressures. It is well known that this entails constructional and process technical problems due, for example, to the necessity to handle corrosive media under pressure and at high temperatures, as in the synthesis of PPS. Other specific disadvantages arise from particular variations of the processes, such as multistage reactions, the use of considerable quantities of auxiliary materials, the risk of hydrolysis of the dihalogenated aromatic compounds by aqueous reaction mixtures, corrosion, etc. This may result in polymers with low molecular weights and inferior quality.

Simplified processes without the application of pressure are known from EP-A 126 369, EP-A 171 021 and EP-A 215 259. These are multistage processes (EP-A 126 369, EP-A 215 259) in which metered dosing of the corrosive media using suitable storage vessels and metering devices (e.g. EP-A 142 024, EP-A 171 021 and EP-A 215 259) may be technically difficult. All the processes require the preparation of sodium sulphide as raw material in a previous reaction.

One-shot reactions (process carried out in a tank) for the production of polyarylene sulphides entailing comparatively little technical expenditure are known from EP-A 109 637, but these are not metered processes (safety aspect).

It is thus an object of the present invention to provide an improved, technically simplified process for the production of polyarylene sulphides, preferably polyphenylene sulphide. The process according to the invention has advantages over the known processes, e.g. no apparatus are required for the preparation of the sulphur-containing reactants, the formation of by-products is to a large extent avoided, e.g. by preventing hydrolysis of the dihalogenated aromatic compounds by reducing the contact times with the aqueous sulphur components, improved volume/time yields, reduced energy consumption by utilizing the heat of neutralisation of $H_2S$ and alkali metal hydroxide, the absence of auxiliary substances, improved product quality, and less loading of the circulations for recovery of the solvents and washing liquids. The process according to the invention is a metered dosing process (safety aspect). Another advantage is the resulting improvement in quality of the polyarylene sulphides obtained according to the invention. The polymers thus produced contain fewer reactive end groups, are lighter in colour and have a lower inorganic salt content.

The invention relates to a process for the production of polyarylene sulphides, preferably polyphenylene sulphides, from
a) identical or different dihalogenated (hetero)-aromatic compounds, preferably dihalogenated aromatic compounds, corresponding to the formulae (I), (II) and-/or (III)

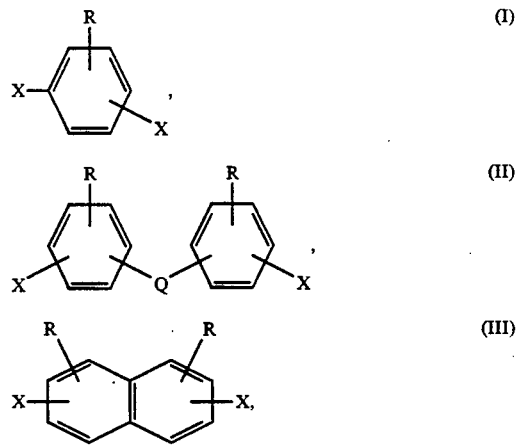

wherein
X denotes a halogen such as chlorine or bromine,
the R's are identical or different and may denote hydrogen, $C_1$-$C_4$-alkyl, $C_5$-$C_{10}$-cycloalkyl, $C_6$-$C_{10}$-aryl, $C_7$-$C_{14}$-alkylaryl or $C_7$-$C_{14}$-arylalkyl and two R's in the ortho-positions to one another and the adjacent carbon atoms in the ring may be linked together to form a $C_5$-$C_{14}$-aromatic ring or a heterocyclic ring having up to three hetero atoms such as N, O or S, and
Q stands for a single bond or a group such as $CR_2$, Ar, O, S, NR, C(O), C(O)—Ar—C(O) or C(O)—N-R—C(O), in which R has the meaning indicated above and Ar stands for a $C_6$-$C_{24}$-aromatic or heteroaromatic group, and optionally up to 20 mol-% of the dihalogenated aromatic compounds may be replaced by $C_1$-$C_{36}$-dihalogenated aliphatic compounds and/or $C_8$-$C_{36}$-aromatic compounds containing at least two aliphatically bound halogens such as chlorine or bromine, and b) optionally from 0.05 to 3 mol-%, based on the sum of a) of tri- or tetrahalogenated aromatic compounds corresponding to formula (IV)

$ArX_n$        (IV)

in which
X stands for a halogen such as chlorine or bromine,
Ar stands for a $C_6$-$C_{24}$-aromatic group or a heteroaromatic group in which up to 3 carbon atoms may be replaced by hetero atoms such as N, O or S, and
n stands for the number 3 or 4, and/or
optionally from 0.05 to 7.5 mol-%, based on the sum of a), of compounds for regulating the molecular weight, preferably monohalogeno and/or monohydroxyl aromatic compounds, c) an alkali metal hydroxide, preferably aqueous or anhydrous sodium or potassium hydroxide or aqueous or anhydrous mixtures thereof, and
d) hydrogen sulphide in
e) a polar, aprotic organic solvent,
characterised in that
i) the dihalogenated aromatic compound mentioned under a) and the additives mentioned under b) and the polar, aprotic organic solvent mentioned under e) are introduced into a reaction vessel and heated to boiling at a slightly reduced pressure of 0.5 bar or slightly raised pressure of up to 6 bar, ii) a sufficient quantity of $H_2S$, at least the quantity corresponding to physical solubility, is then forced into the reaction vessel under a slightly reduced (0.5 bar) to slightly raised (10 bar) pressure, iii) the approximately 1.5 to 2.2 times molar quantity, based on the sum of components (a+b), of the alkali metal hydroxide mentioned under c), preferably NaOH or KOH, is then introduced as aqueous or anhydrous melt in a very finely divided form into the reaction mixture and water is distilled off azeotropically, iv) hydrogen sulphide is passed into or over the reaction solution simultaneously with iii), and v) after all the components have been added, the solution is heated to 180°-250° C. and the reaction is carried out until the molecular weight has been built up.

After introduction of the alkali metal hydroxide, the reaction is carried out under an inert gas (e.g. $N_2$).

The reaction time may vary over a wide range of from less than 1 hour to 30 hours, preferably from 2 to 12 hours. Unreacted hydrogen sulphide may escape at the top after introduction of the alkali metal hydroxide and may, for example, be recycled. Unreacted halogenated aromatic compounds may be removed from the reaction mixture at the end of the reaction, for example by distillation.

In one particular embodiment of the invention, multitank cascades may be used, which may be increased in number to the point where a continuous reaction is obtained. It is advantageous to use apparatus in which all the parts which come into contact with the reaction mixture are made of corrosion resistant materials or are coated with such materials, e.g. titanium, zirconium, glass, certain refined steels and plastics which are resistant under the reaction conditions.

Isolation of the polyarylene sulphides is carried out in known manner (e.g. EP-A 374 462).

Examples of dihalogenated aromatic compounds corresponding to formulae I-III which may be used according to the invention are mentioned e.g. in EP-A 374 462.

In one particular embodiment of the invention, dihalogenated aromatic compounds may be partly or completely replaced by linear, branched or cyclic (upwards Of $C_5$) $C_1$-$C_{36}$-dihalogenated aliphatic compounds containing Cl or Br, such as 1,2-dichloroethane, 1,3-dichloropropane, 1,3-dichlorobutane, 2,3-dichlorobutane, 1,4-dichlorobutane, 1,2-dichloro-2-methylpropane, 1,3-dichloro-2,2-dimethylpropane, 1,5-dichloropentane, 1,6-dichlorohexane-1,7-dichloroheptane, 1,8-dichlorooctane, 1,9-dichlorononane, 1,10-dichlorodecane, 1,11-dichloroundecane, 1,12-dichlorododecane, higher dichloroparaffins, 1,2-dichlorocyclohexane, 1,3-dichlorocyclohexane, 1,4-dichlorocyclohexane, etc. or by $C_8$-$C_{36}$-aromatic compounds containing at least two aliphatically bound halogens such as Cl or Br, such as o-xylylene dichloride, m-xylylene dichloride, p-xylylene dichloride, 1,3-bis-(chloromethyl)-4,6-dimethylbenzene, etc.

The following are examples of branching agents of formula (IV) suitable for the invention: 1,2,4-Trichlorobenzene, 1,3,5-trichlorobenzene, 1,3,5-tribromobenzene, 1,3,5-tris-(4-chlorophenyl)-benzene, 1,3,5-tris-(4-bromophenyl)-benzene, 2,2',4,4'-tetrachlorodiphenyl and 2,2',4,4'-tetrachlorodiphenylsulphide.

Phenol, thiophenol, their alkali metal salts (Li, Na, K), bromobenzene, 4-chlorodiphenyl, 4-chlorodiphenylsulphone, 4-chlorodiphenylsulphide, 1-chloronaphthalene, 2-chloronaphthalene and 4-bromodiphenyl are examples of compounds which may be used according to the invention for regulating the molecular weight.

Examples of suitable solvents used for the invention are mentioned e.g. in EP-A 374 462. The normal boiling point should be from 200° C. to 280° C. The reaction may be carried out under slight excess pressure for reaching these temperatures. N,N-Dialkylcarboxylic acid amides of $C_1$-$C_8$-aliphatic and $C_6$-$C_{12}$-aromatic carboxylic acids, for example, may be used as co-solvents in a quantity of from 0.02 to 1.0 mol, based on 1 mol of hydrogen sulphide, e.g. N,N-dimethylacetamide, N,N-diethylacetamide or N,N-dimethylpropionamide.

The polymers according to the invention have molecular weights $M_n$ of about 1000 to 100,000. Determination of the molecular weights may be carried out by, for example, a chromatographic method or by measurement of the fusion viscosity (see e.g. EP-A 171 021).

The polyarylene sulphides produced according to the invention may be used together with conventional fillers, reinforcing agents and auxiliary substances and/or polymers for the production of shaped articles.

The shaped articles may be, for example, extrudates such as fibres, films, boards, pipes, sections, etc., injection moulded parts or composite parts.

The polyarylene sulphides produced according to the invention may be mixed with the usual quantities of conventional fillers and reinforcing materials (e.g. Modern Plastics Encyclopedia 1988, Vol.64, No. 10A, pages 183-194) or auxiliary agents (loc. cit., pages 127-178).

The shaped products may also contain other polymers such as (co)polyarylene sulphides, polycondensates, polyaddition products, polymers, etc.

The polyarylene sulphides produced according to the invention may be used as shaped articles for the usual purposes, e.g. as parts of motor vehicles, mountings and fittings, valves, ball-bearing parts, electrical parts such as switches, electronic boards, chemically resistant and weather resistant parts and apparatus such as pump housings and pump impellers, dishes for etching baths, sealing rings, parts of office machinery, telecommunication apparatus and household appliances.

EXAMPLES

EXAMPLE 1

4860 g of N-methylcaprolactam and
2205 g of p-dichloro-benzene are introduced into a 10 liter, stirrer vessel which has been rendered inert with nitrogen, and the mixture is heated to boiling at normal pressure with further introduction of $N_2$.

1188 g of sodium hydroxide and
509 g of water are introduced into a heated receiver.

The substances are thoroughly mixed. The introduction of $H_2S$ gas (180-190 g/h) is begun as soon as the stirrer vessel is at a temperature of at least 210° C. After the onset of $H_2S$ gas introduction, the contents of the receiver are added within 3 hours. The temperature of the reaction solution in the stirrer vessel is then about 212° C. The stream of vapour from the stirrer vessel is passed through a column, condensed and then transferred to a separating vessel. The water which separates is removed from the separating vessel and thus removed from the process while p-dichlorobenzene is returned to the column. Excess $H_2S$ escapes via the condenser.

Introduction of H₂S is continued for one hour after all the NaOH has been added. Thereafter, nitrogen is introduced instead of H₂S.

The stirrer vessel is then heated to 230> C. while the polycondensation reaction is continued.

After expiry of the reaction time, the reaction mixture is crystallised and is worked up as described in EP-A 374 462.

Analysis of the polyphenylene sulphide obtained:

| | |
|---|---|
| Viscosity: | 301.0 Pa · s (by the plate and cone method according to EP-A 171 021) |
| Yield: | 92.0% (based on p-dichlorobenzene) |
| Inorganic chlorine: | <5.0 ppm |
| H₂S uptake: | 98.8% of theoretical |

COMPARISON EXAMPLE 1

To demonstrate the superiority of the proposed process.

Sodium sulphide and sodium hydrogen sulphide in a molar ratio of 2:1 were introduced as source of sulphur into the apparatus described in Example 1. The subsequent reaction and working up were carried out as in Example 1.

| Results: | Example 1 | Comparison Example 1 |
|---|---|---|
| Viscosity in Pa · s | 301 | 95.0 |
| Yield in % | 92 | 91.5 |
| PPS colour[1] | 8 | 200.0 |
| Colour of mother liquor removed by suction filtration | light | dark |

[1] as 10% solution in N-methylcaprolactam at 20° C. compared with a standard iodine solution

COMPARISON EXAMPLE 2

An NaHS/Na₂S mixture in a molar ratio of 2:1 freshly prepared from H₂S and NaOH outside the reactor was introduced as source of sulphur into the reactor sump of the apparatus mentioned in Example 1. The subsequent reaction and working up were carried out as in Example 1.

| Results: | Example 1 | Comparison Example 2 |
|---|---|---|
| SH end groups in % | 0.2 | 0.3 |
| Viscosity in Pa · s | 301 | 180 |
| Inorganic chlorine in PPM | <5 | 8 |
| PPS colour[1] | 8 | 30 |
| Colour of the mother liquor | light | dark |

We claim:

1. A process for the production of polyarylene sulphides from
   a) identical or different dihalogenated aromatic compounds corresponding to formula (I),

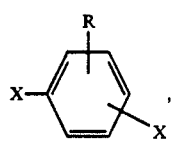

(I)

in which x is a halogen,

R is hydrogen C₁-C₄-alkyl, C₅-C₁₀-cycloalkyl, C₆-C₁₀-aryl, C₇-C₁₄-alkylaryl, or C₇-C₁₄-arylalkyl, optionally up to 20 mol-% of the dihalogenated aromatic compound may be replaced by at least one of C₁-C₃₆-dihalogenated aliphatic compounds and C₈-C₃₆-aromatic compounds containing at least two aliphatically bound halogens, b) optionally, at least one of i) from 0.05 to 3 mol-%, based on the sum of a), of tri- or tetrahalogenated aromatic compounds corresponding to formula (IV)

$$ArX_n \qquad (IV)$$

wherein

X is a halogen,

Ar is a C₆-C₂₄-aromatic group or a heteroaromatic group in which up to 3 carbon atoms may be replaced by hetero atoms selected from the group consisting of N, O and S, and n is the number 3 or 4, and ii) from 0.05 to 7.5 mol-%, based on the sum of a), of compounds for regulating the molecular weight, c) alkali metal hydroxide, d) hydrogen sulphide, and e) a polar, aprotic organic solvent, wherein i) the dihalogenated aromatic compound mentioned under a), additives mentioned under b) and the polar, aprotic organic solvent mentioned under e) are introduced into a reaction vessel and heated to boiling at a pressure of from 0.5 bar to 6 bar, ii) a sufficient quantity of hydrogen sulphide from d), at least the quantity corresponding to physical solubility, is then forced into the reaction vessel under a pressure of from 0.5 bar to 10 bar, iii) approximately 1.5 to 2.2 times molar quantity, based on the sum of components (a+b), of alkali metal hydroxide mentioned under c) is then introduced into the reaction mixture as aqueous or anhydrous melt in a very finely divided form and water is distilled off azeotropically, iv) hydrogen sulphide is introduced into or over the reaction mixture simultaneously with iii), and v) when all the components have been added, the reaction mixture is heated to 180°-250° C. and the reaction is continued until the molecular weight has been built up.

2. A process according to claim 1, wherein the alkali metal hydroxide is sodium hydroxide and may be mixed with from 0 to 60% by weight of water and further wherein the sodium hydroxide/water mixture is introduced in a very finely divided form.

3. A process according to claim 1, wherein the dihalogenated aromatic compound corresponding to formula (I) is p-dichlorobenzene.

4. A process according to claim 1, wherein the hydrogen sulphide is introduced into the reaction mixture.

5. A process according to claim 1, wherein a cascade of connected reaction vessels is used and further wherein the process is carried out continuously.

6. A process according to claim 1, wherein X in part a) is chlorine or bromine.

7. A process according to claim 1, wherein X in part b) is chlorine or bromine.

8. A process according to claim 1, wherein said compounds for regulating the molecular weight consist of monohalogenated or monohydroxy aromatic compounds.

9. A process according to claim 1, wherein the alkali metal hydroxide comprises at least one of aqueous sodium hydroxide, aqueous potassium hydroxide, anhydrous sodium hydroxide and anhydrous potassium hydroxide.

10. A process according to claim 1, wherein said reaction mixture comprises from 0.05 to 3 mol-%, based on the sum of a), of tri- or tetrahalogenated aromatic compounds corresponding to formula (IV)

$$ArX_n \qquad (IV)$$

wherein

X is a halogen,

Ar is a $C_6$-$C_{24}$-aromatic group or a heteroaromatic group in which up to 3 carbon atoms may be replaced by hetero atoms selected from the group consisting of N, O and S, and n is the number 3 or 4, and from 0.05 to 7.5 mol-%, based on the sum of a), of compounds for regulating the molecular weight.

11. A process according to claim 1, wherein up to 20 mol-% of the dihalogenated aromatic compound is replaced by at least one of $C_1$-$C_{36}$-dihalogenated aliphatic compounds and $C_8$-$C_{36}$-aromatic compounds containing at least two aliphatically bound halogens.

12. A process according to claim 10, wherein up to 20 mol-% of the dihalogenated aromatic compound is replaced by at least one of $C_1$-$C_{36}$-dihalogenated aliphatic compounds and $C_8$-$C_{36}$-aromatic compounds containing at least two aliphatically bound halogens.

* * * * *